(12) United States Patent
Hauswirth et al.

(10) Patent No.: US 8,902,219 B1
(45) Date of Patent: Dec. 2, 2014

(54) MAINTAINING CONNECTION TO EMBEDDED CONTENT USING GRAPHICAL ELEMENTS

(75) Inventors: Jeffrey Hauswirth, Westminster, CO (US); Preston Jackson, Longmont, CO (US); Brian Brown, Longmont, CO (US); Patrick Lacz, Boulder, CO (US); Paul McLean, Denver, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 22 days.

(21) Appl. No.: 13/238,768

(22) Filed: Sep. 21, 2011

Related U.S. Application Data

(60) Provisional application No. 61/385,466, filed on Sep. 22, 2010.

(51) Int. Cl.
*G06T 15/00* (2011.01)

(52) U.S. Cl.
USPC .......................................................... 345/419

(58) Field of Classification Search
None
See application file for complete search history.

(56) References Cited

U.S. PATENT DOCUMENTS

| | | | |
|---|---|---|---|
| 5,559,707 A | 9/1996 | Delorme et al. | |
| 5,675,788 A | 10/1997 | Husick et al. | |
| 5,818,724 A | 10/1998 | Brewster et al. | |
| 6,215,498 B1 | 4/2001 | Filo et al. | |
| 6,336,074 B1 | 1/2002 | Woo | |
| 6,363,404 B1 | 3/2002 | Dalal et al. | |
| 6,694,064 B1 | 2/2004 | Benkelman | |
| 7,054,701 B2 * | 5/2006 | Shimizu et al. | 700/98 |
| 7,343,626 B1 | 3/2008 | Gallagher | |
| 7,415,356 B1 | 8/2008 | Gowda et al. | |
| 7,865,301 B2 | 1/2011 | Rasmussen et al. | |
| 7,873,697 B2 | 1/2011 | Goldstein et al. | |
| 8,274,506 B1 | 9/2012 | Rees | |
| 8,290,943 B2 | 10/2012 | Carbone et al. | |
| 2002/0011941 A1 | 1/2002 | Endo et al. | |
| 2002/0047895 A1 | 4/2002 | Bernardo et al. | |
| 2002/0089499 A1 * | 7/2002 | Lee et al. | 345/419 |
| 2002/0158886 A1 * | 10/2002 | Hallbauer et al. | 345/619 |
| 2004/0039987 A1 | 2/2004 | Coppin et al. | |
| 2004/0176908 A1 | 9/2004 | Senda et al. | |
| 2004/0205554 A1 | 10/2004 | Goswami et al. | |
| 2005/0034062 A1 | 2/2005 | Bufkin et al. | |
| 2005/0083325 A1 | 4/2005 | Cho | |
| 2005/0270311 A1 | 12/2005 | Rasmussen et al. | |
| 2006/0005114 A1 | 1/2006 | Williamson et al. | |
| 2006/0173657 A1 * | 8/2006 | Haws et al. | 703/1 |

(Continued)

OTHER PUBLICATIONS

Heitzman "SketchUp Instructions," Triton College, Nov. 6, 2010, pp. 1-25.

(Continued)

*Primary Examiner* — Phi Hoang
*Assistant Examiner* — Mohammad H Akhavannik
(74) *Attorney, Agent, or Firm* — Sheridan Ross P.C.

(57) ABSTRACT

A system and method for dynamically linking or connecting annotations to embedded content, such as a 3D model, using graphical elements within a two-dimensional space is provided. Such connection is maintained as the annotation is rendered with the 3D model, thereby enabling the annotations to intelligently update themselves using 3D information from the embedded content. Further, the capability, as provided herein, to manipulate viewing positions and perspective effects of an embedded 3D model without disrupting the annotations in the two-dimensional page layout provides a greater degree of flexibility and forgiveness.

23 Claims, 14 Drawing Sheets

(56) References Cited

U.S. PATENT DOCUMENTS

| | | | |
|---|---|---|---|
| 2007/0088671 A1 | 4/2007 | McElroy et al. | |
| 2008/0221790 A1 | 9/2008 | Min et al. | |
| 2008/0291205 A1 | 11/2008 | Rasmussen et al. | |
| 2009/0063948 A1* | 3/2009 | Finn et al. | 715/230 |
| 2009/0100368 A1* | 4/2009 | Look et al. | 715/775 |
| 2009/0106307 A1 | 4/2009 | Spivack | |
| 2010/0010697 A1 | 1/2010 | Soma et al. | |
| 2010/0201684 A1* | 8/2010 | Yadav et al. | 345/420 |
| 2010/0298050 A1 | 11/2010 | Taraschuk et al. | |
| 2011/0022295 A1 | 1/2011 | Lee | |
| 2011/0055024 A1 | 3/2011 | Shen | |
| 2011/0064312 A1 | 3/2011 | Janky et al. | |
| 2011/0093197 A1 | 4/2011 | Bowman et al. | |
| 2012/0017148 A1 | 1/2012 | Watt et al. | |
| 2012/0038623 A1 | 2/2012 | Van Raamsdonk | |
| 2012/0044089 A1 | 2/2012 | Yarnold et al. | |
| 2012/0317171 A1 | 12/2012 | Lu | |
| 2013/0002647 A1 | 1/2013 | Bacus et al. | |
| 2013/0002648 A1 | 1/2013 | Bacus et al. | |
| 2013/0007575 A1 | 1/2013 | Bacus et al. | |

OTHER PUBLICATIONS

Adobe Creative Team. Adobe Acrobat 9: Classroom in a Book. Berkeley, Calif: Peachpit, 2009.

Ahmed "Display Live Web Pages in PowerPoint Presentation Slides," Oxhow. Published Mar. 29, 2011. Web. Accessed May 12, 2014.

Byrnes, David. AutoCAD 2010 for Dummies. Hoboken, NJ; Wiley Publishing, Inc. 2009.

Parker, Roger. Microsoft Office 4 for Windows for Dummies. Foster City, Calif: IDG Books Worldwide, inc., 1994.

International Search Report and Written Opinion for Application No. PCT/US2012/044401, dated Jan. 3, 2013.

International Preliminary Report on Patentability for International (PCT) Patent Application No. PCT/US2012/044401, mailed Jan. 16, 2014 6 pages.

Official Action for U.S. Appl. No. 13/172,580, mailed May 29, 2014 27 pages.

Official Action for U.S. Appl. No. 13/172,591, mailed Apr. 30, 2014 33 pages.

"AutoCad Basics: Dimensions and Dimension Styles in AutoCAD," available at http://comp3820.hubpages.com/hub/AutoCAD-Basics-Dimensions-and-Dimension-Styles-in-AutoCAD-tutorial, Jul. 23, 2009, 3 pages.

"Google LayOut 2 Help," Google, 2008, 323 pages.

"SketchUp User's Guide," Google, 2006, 370 pages.

International Search Report and Written Opinion for International Patent Application No. PCT/US2012/044396, dated Dec. 28, 2012, 7 pages.

International Preliminary Report on Patentability for International Patent Application No. PCT/US2012/044396, dated Jan. 7, 2014, 5 pages.

International Search Report and Written Opinion for International Patent Application No. PCT/US2012/044386, dated Jan. 25, 2013, 7 pages.

International Preliminary Report on Patentability for International Patent Application No. PCT/US2012/044386, dated Jan. 7, 204, 5 pages.

Official Action for U.S. Appl. No. 13/172,591, mailed May 21, 2013, 41 pages.

Final Action for U.S. Appl. No. 13/172,591, mailed Oct. 10, 2013, 39 pages.

Official Action for U.S. Appl. No. 13/172,602, mailed Jul. 18, 2013, 24 pages.

Final Action for U.S. Appl. No. 13/172,602, mailed Dec. 18, 2013, 31 pages.

* cited by examiner

MAINTAINING CONNECTION TO EMBEDDED CONTENT USING GRAPHICAL ELEMENTS

CROSS REFERENCE TO RELATED APPLICATIONS

The present application claims the benefit of U.S. Provisional Patent Application No. 61/385,466, filed on Sep. 22, 2010, entitled "Maintaining Connection to Embedded Content Using Graphical Elements" by Hauswirth, et al., which is incorporated herein by reference in its entirety.

BACKGROUND

1. Field

Embodiments relate generally to the field of three-dimensional (3D) computer graphics, particularly to computer aided design tools.

2. Background

Computers have been used for computer aided design, drafting, and modeling since their inception. The early computer aided design (CAD) applications were used to simplify the creation of two-dimensional models of design objects. The creation of architectural drawings and electronic circuit layouts were just a few of these early applications.

The benefits realized by two-dimensional computer drafting applications are significantly multiplied when such an application adds the capability to model geometries in three dimensions. However, typical computer applications that provide three-dimensional (3D) modeling capabilities have been complex and required significant user training. Further, updating or changing the 3D models has been a time-consuming, manual task.

BRIEF SUMMARY

The capability to annotate embedded content with descriptions and comments is provided. Further, the capability to dynamically link or connect an annotation to the embedded content, such as a 3D model, and maintain such a connection using graphical elements within a two-dimensional space is provided. Such capability can also enable the annotations to intelligently update themselves using 3D information from the embedded content. Further, the capability to manipulate viewing positions and perspective effects of an embedded 3D model without disrupting the annotations in the two-dimensional page layout provides a greater degree of flexibility for design professionals.

Embodiments relate to maintaining a connection or dynamic link to embedded content using graphical elements associated with the embedded content. In an embodiment, an annotation object may be added to an embedded three-dimensional model within a two-dimensional viewport space. The user input corresponding to the embedded three-dimensional model within the two-dimensional viewport space is detected. The annotation object may be added to at least a portion of the embedded three-dimensional model based on the detected user input. The annotation object may be rendered with the three-dimensional model within the two-dimensional viewport space. Connection information may be stored in association with the annotation object in memory. The annotation object may be rendered with the embedded three-dimensional model within the two-dimensional viewport space based on the connection information stored with the annotation object. The annotation object may then be dynamically changed within the two-dimensional viewport space as it is rendered with the embedded three-dimensional graphical model so as to reflect any changes made to the embedded three-dimensional graphical model within three-dimensional space.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 1:
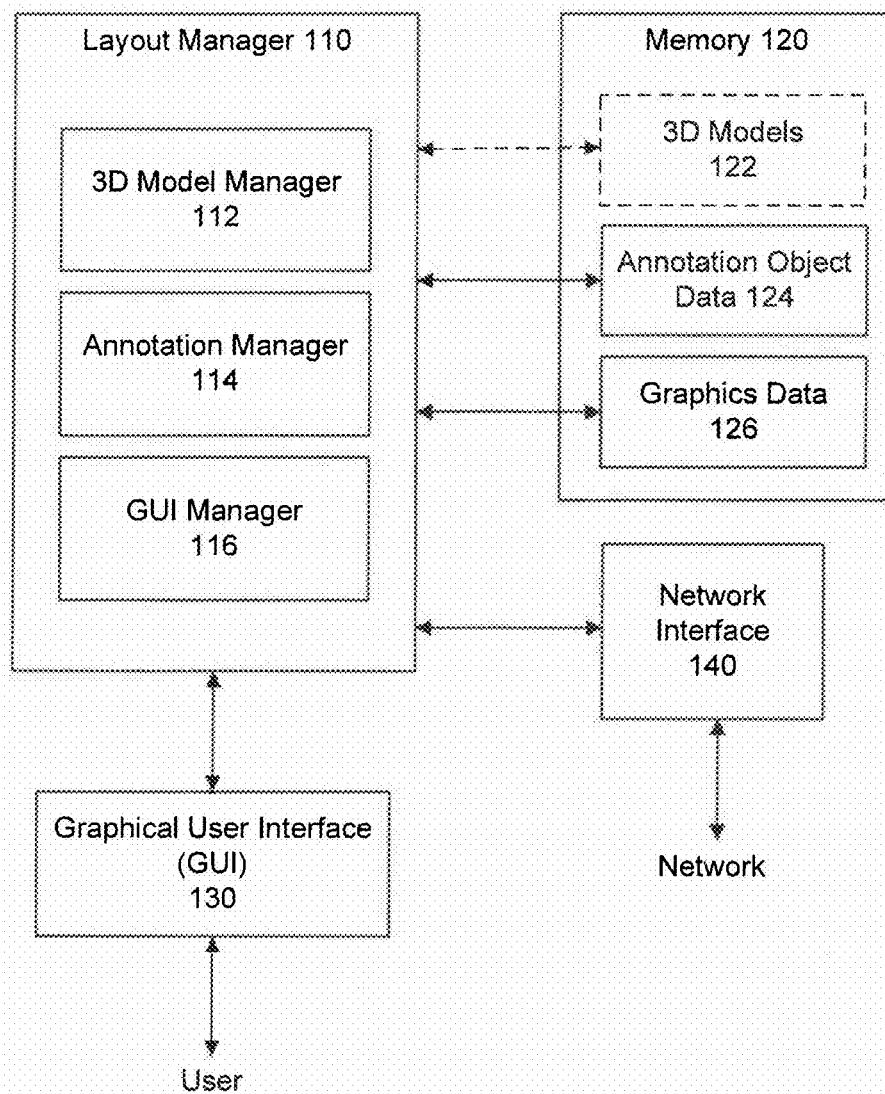
FIG. 1 is a system diagram of an exemplary computing device for maintaining connection to embedded content using graphical elements, according to an embodiment.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

I. Introduction

Three-dimensional (3D) modeling computer applications have been developed to be more accessible to users and easier to use relative to other 3D CAD applications. An example of such a 3D modeling application is SketchUp from Google Inc. of Mountain View, Calif. To facilitate using 3D modeling applications even further, page layout applications have been developed that can be used in conjunction with the 3D modeling applications. An example of such a page layout application is Google SketchUp Pro LayOut (hereinafter referred to as "LayOut"), which is also from Google Inc. of Mountain View, Calif.

For example, LayOut allows design professionals to create two-dimensional presentations in digital or paper format by embedding 3D models created in SketchUp within LayOut directly, whereas traditionally, 3D models had to be exported as static images and later imported into a separate presentation application. Thus, these new 3D modeling and page layout tools have allowed design professionals to work more efficiently by reducing the amount of time spent composing and updating two-dimensional presentations corresponding to the 3D models.

However, as embedded 3D models often need to be changed or updated within a page layout, design professional may still face the time-consuming task of manually updating any annotations that have been made to the 3D model within the page layout.

Embodiments relate to maintaining a connection or dynamic link to embedded content using a graphical element. Embodiments allow an annotation to be dynamically linked or connected to embedded content, such as an embedded 3D model, within a two-dimensional space using one or more graphical elements. Such connection is maintained as the annotation is rendered with the 3D model, thereby enabling the annotations to intelligently update themselves using 3D information from the embedded content. Further, embodiments enable users to manipulate viewing positions and perspective effects of an embedded 3D model without disrupting the annotations in the two-dimensional page layout.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. System

FIG. 1 is a system diagram of an exemplary computing device 100 for maintaining connection to an embedded content using graphical elements, according to an embodiment. Computing device 100 includes a layout manager 110, a memory 120, a graphical user interface (GUI) 130, and a network interface 140, according to an embodiment. Layout manager 110 includes a 3D model manager 112, an annotation manager 114, and a GUI manager 116, according to an embodiment. In an embodiment, layout manager 110 and its components (3D model manager 112, annotation manager 114, and GUI manager 116), memory 120, GUI 130, and network interface 140 may be communicatively coupled to one another via, for example, an internal bus of computing device 100. In an embodiment, memory 120 may be used to store 3D models 122, annotation object data 124, and/or graphics data 126.

Computing device 100 can be any type of computing device having one or more processors, a user input (for example, a mouse, QWERTY keyboard, touch-screen, a graphics tablet, or microphone), and a communications infrastructure capable of receiving and transmitting data over a network. For example, computing device 100 can include, but is not limited to, a mobile phone, a personal digital assistant (PDA), a computer, a cluster of computers, a set-top box, or other similar type of device capable of processing instructions and receiving and transmitting data to and from humans and other computing devices. Although only layout manager 110, 3D model manager 112, annotation manager 114, GUI manager 116, memory 120, GUI 130, and network interface 140 are shown, it would be apparent to a person skilled in the art that computing device 100 may include additional components, modules, and/or sub-components as necessary.

As will be described in further detail below, memory 120 can be used to store information accessible by one or more of 3D model manager 112, annotation manager 114, and GUI manager 116, according to an embodiment. Memory 120 may be any type of recording medium coupled to an integrated circuit that controls access to the recording medium. The recording medium can be, for example and without limitation, a semiconductor memory, a hard disk, or other similar type of memory or storage device. Moreover, memory 120 may be integrated within computing device 100, a stand-alone device communicatively coupled to computing device 100 via a direct connection, or a cloud-based storage location coupled to computing device 100 over a network.

In an embodiment, layout manager 110 is communicatively coupled to GUI 130. GUI 130 can be any type of graphical user interface display coupled to computing device 100 for displaying information and content to a user. Further, layout manager 110 can be communicatively coupled to network interface 140 for receiving and/or transmitting information over a network. The network can be any network or combination of networks used to communicate information between different computing devices. Such a network can include, but is not limited to, a wired (e.g., Ethernet) or a wireless (e.g., Wi-Fi and 3G) network. In addition, such a network can include, but is not limited to, a local area network, medium area network, and/or wide area network such as the Internet.

Layout manager 110, including its components (3D model manager 12, annotation manager 114, and GUI manager 116), can be implemented in software, firmware, hardware, or any combination thereof. Embodiments of 3D model manager 112, annotation manager 114, and GUI manager 116, or portions thereof, can also be implemented to run on any type of processing device including, but not limited to, a computer, workstation, embedded system, networked device, mobile device, or other type of processor or computer system capable of carrying out the functionality described herein.

In operation, 3D model manager 112 can receive or acquire content that can be embedded into a two-dimensional viewport space, in accordance with au embodiment. The two-dimensional (2D) viewport space can be implemented as a 2D viewport into a 3D virtual world. Different types of content, including, but not limited to, 3D content, may be embedded into the 2D viewport space. The embedded 3D content can include, but is not limited to, 3D graphical models. For ease of explanation, embodiments of 3D model manager 112, annotation manager 114, and GUI manager 116 are described with respect to FIGS. 2A-2C, but are not intended to be limited thereto. Further, embodiments are described herein with respect to 3D content and 3D models for illustrative purposes only. A person skilled in the relevant art given this description would appreciate that other types of embedded content may be used as necessary.

In an embodiment, 3D model manager 112 embeds a 3D graphical model within the 2D viewport space, which then displays a 2D representation of the 3D model using, for example, GUI 130. The 3D graphical model may itself be a representation of a real-world object, such as a house (see, e.g., 3D model 200 shown in FIGS. 2A-2C, discussed in further detail below). In this regard, the scale of the 3D model represented in the 2D viewport space is generally not 1:1. For example, a 3D model of a house rendered in the 2D viewport space may be assigned a scale such as 1:12 where every inch in the 2D viewport space represents twelve inches (one foot) of the actual physical house. It is noted that the 2D viewport space may comprise additional elements that do not represent real world objects, for example and without limitation, blocks of text.

The embedded object within the 2D viewport space can include information that is associated with it, such as metadata describing various attributes specific to the embedded object. For example, an embedded 3D model can include information corresponding to the geometry of various graphical elements that are rendered in the 2D viewport space. Further, the 3D model itself can be associated with a 3D space. For example, the 3D model may have been created using a 3D modeling computer program capable of representing objects at an actual 1:1 scale. An example of such a 3D modeling program is SketchUp from Google Inc. of Mountain View, Calif. The 3D models may be stored at memory 120 as 3D models 122 or may be received directly from the 3D modeling program via, for example, a communication or programming interface between the 3D modeling program and layout manager 110.

Further, the 2D viewport space may display the embedded 3D model from the perspective of a virtual camera. Such a perspective may be defined by a three-dimensional view frustum such as, for example, a truncated three-dimensional pyramid. The view frustum represents the virtual camera's viewable content area within a three-dimensional space. Additionally, embedded content within the 2D viewport space can be displayed at varying levels of detail depending on distance from the virtual camera. In an embodiment, the user can manipulate the user's viewpoint of the frustum using an input device, such as, for example, a mouse, coupled to computing device 100.

In an embodiment, GUI manager 116 receives the user input and sends it to 3D model manager 112. Based on the received user input from GUI manager 116, 3D model manager 112 changes, in real-time, the orientation and position of the frustum. From the user's perspective, the user is changing the orientation and/or position of the 3D model itself within the 2D viewport space. Additional aspects of virtual cameras and view frustums would be apparent to a person skilled in the relevant art given this description.

In an embodiment, annotation manager 114 enables a user at computing device 100 to add an annotation object to the embedded 3D model within the 2D viewport space. Accordingly, the user may interact with the embedded 3D model using an input device (e.g., a mouse) coupled to computing device 100 in order to add annotations for purposes of identifying or describing specific portions of the embedded 3D model. For example, the user may add an architectural dimension (or simply "dimension") object, described in further detail below, to identify a distance between portions of an embedded 3D model (see, e.g., annotation object 202 shown in FIG. 2B). In an embodiment, GUI manager 116 detects the user input corresponding to the embedded 2D model within the 2D viewport space and sends it to annotation manager 114.

In an embodiment, annotation manager 114 renders the annotation object based on the user input it receives from GUI manager 116. For example, as will be described in further detail, the type of annotation object may depend on the position of the detected input within the 2D viewport space. Further, annotation manager 114 may display one or more different visual indicators with respect to the embedded 3D model that help guide the user in the creation of different types annotation object. To render the annotation object, annotation manager 114 may retrieve information pertaining to various types of annotation objects from annotation object data 124 stored in memory 120, according to an embodiment.

A. Example User Interaction for Adding Dimension Object

Figure 3A:
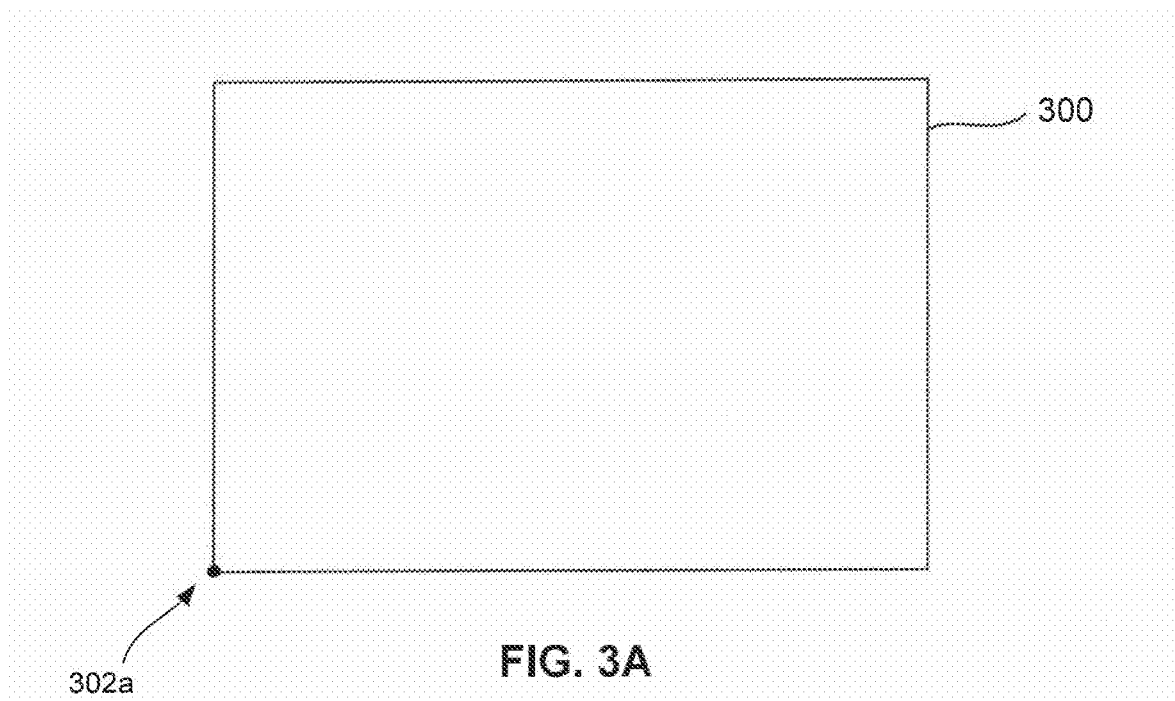
FIGS. 3A-3C illustrate an exemplary process of adding a type of annotation object to a portion of an embedded object, according to an embodiment.
Figure 3B:
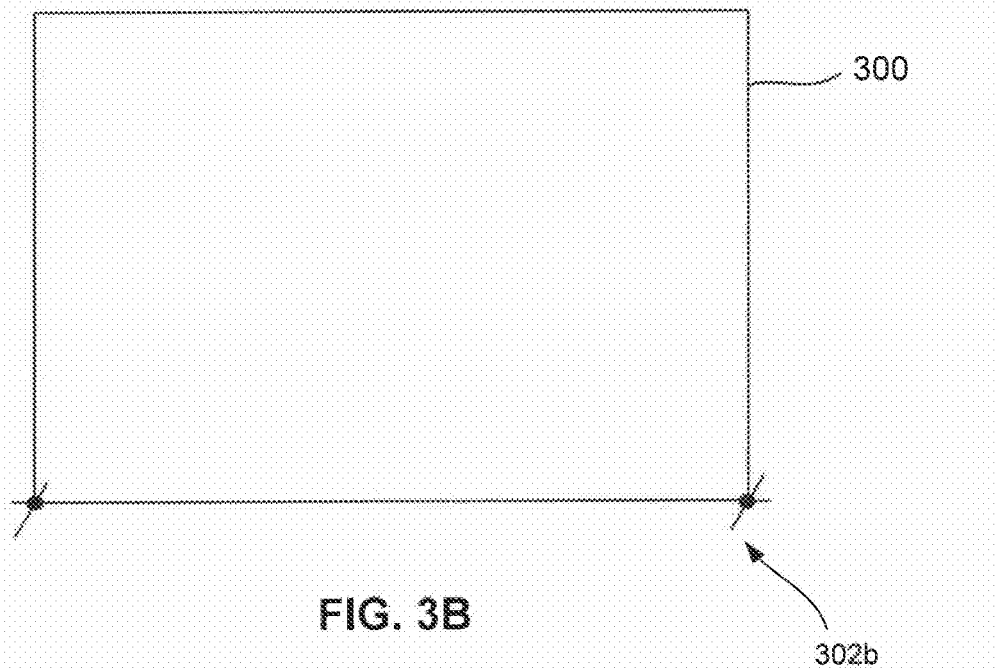
Figure 3C:
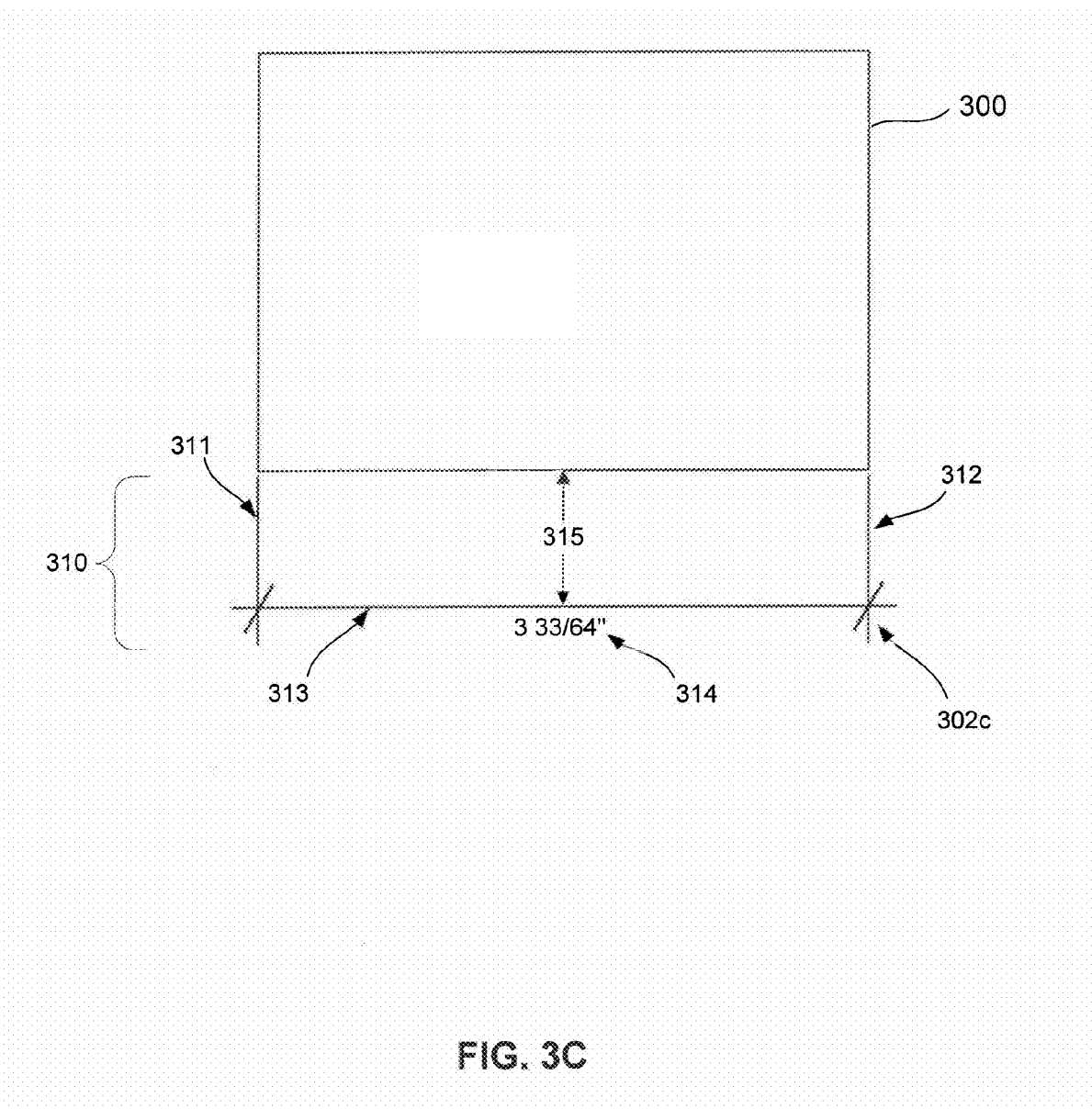

FIGS. 3A-3C illustrate an exemplary user interaction for adding a dimension object to a portion of an embedded object 300, according to an embodiment. It is noted that dimension objects are presented for illustrative purposes and embodiments are not limited thereto. It would be apparent to a person skilled in the relevant art given this description that other types of annotation objects may be used as necessary.

The example user interaction begins in FIG. 3A, in which the user starts by setting a base point 302*a*, for example, by mouse-clicking the point on embedded object 300 within the 21) viewport space. In FIG. 3B, the user clicks on a second control point 302*b*, which sets a length for the dimension object. In an embodiment, annotation manager 114 identifies the dimension as a horizontal dimension based on the location of base point 302a and point 302b with respect to embedded object 300. In FIG. 3C, the user drags the mouse down vertically and mouse-clicks a third time at a control point 302c in the 2D viewport space to create the annotation object, as shown.

Figure 4A:
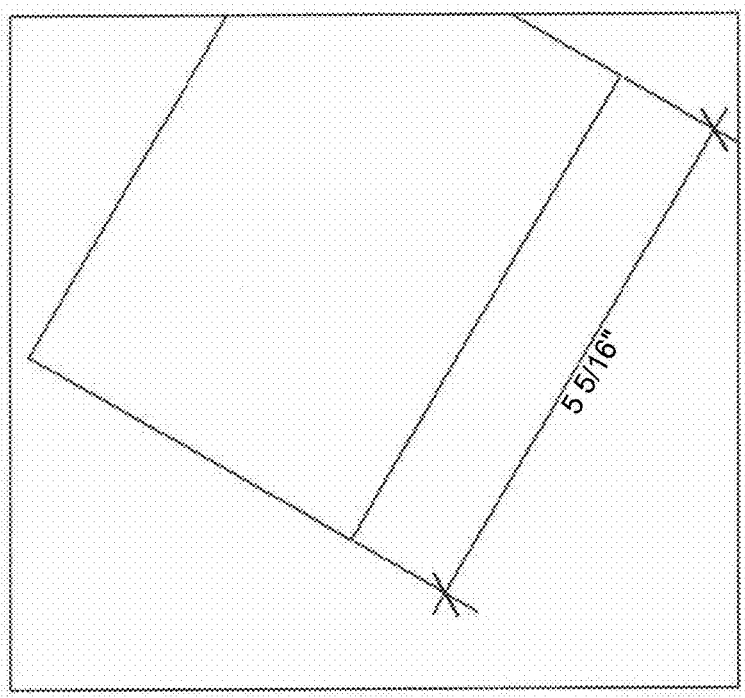
FIGS. 4A-4C, show horizontal and vertical dimensions corresponding to a rotated embedded model, according to an embodiment.
Figure 4B:
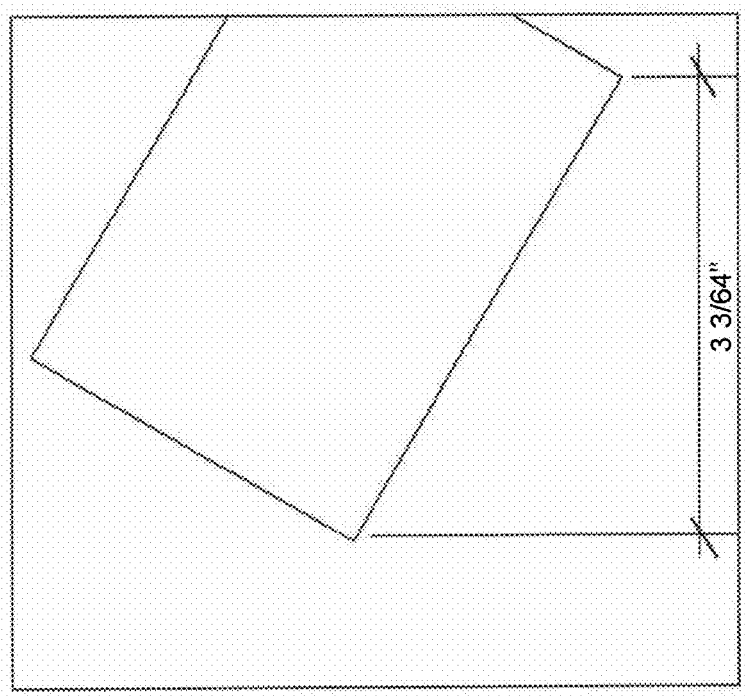
Figure 4C:
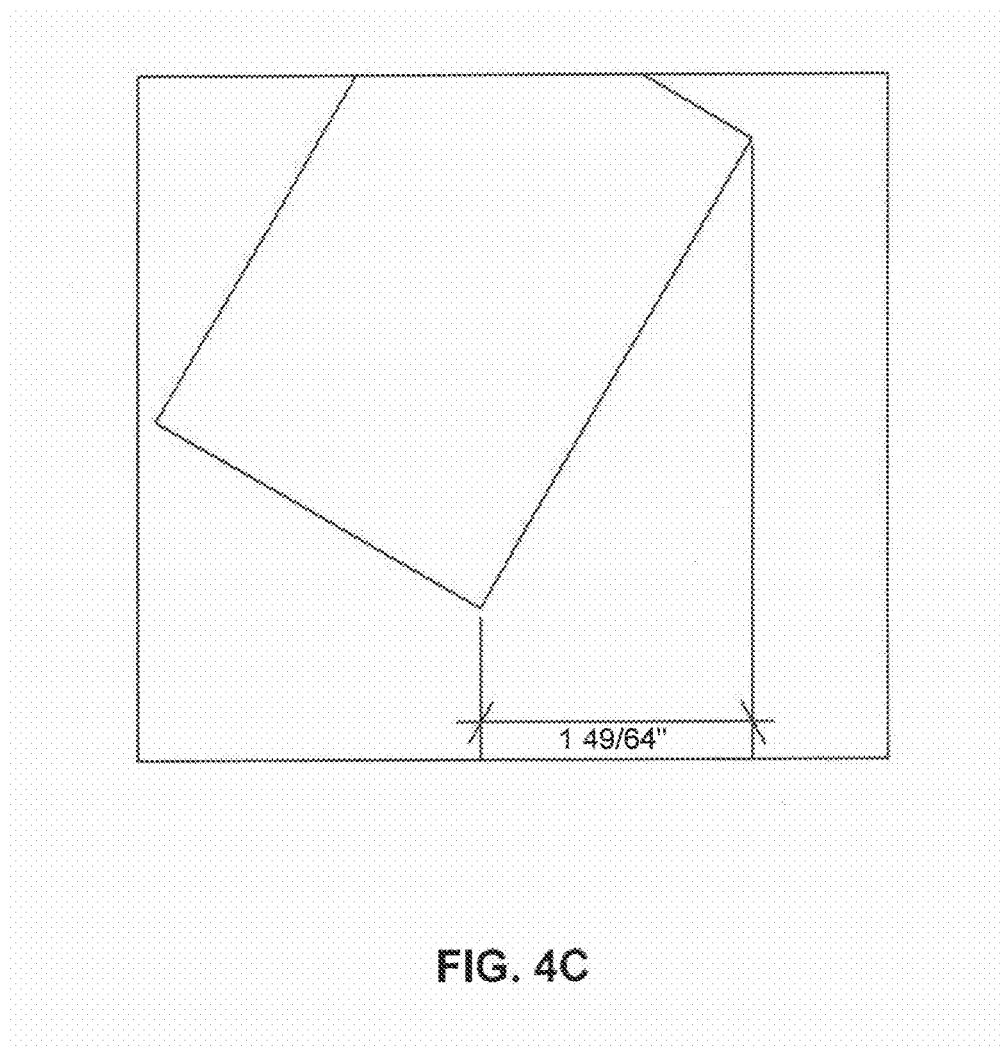

It is noted that different types of dimension objects may be used as necessary. In an example, FIGS. 4A-4C show horizontal and vertical dimensions corresponding to a rotated embedded model. In an embodiment, dimensions may be either linear or angular. For example, a linear dimension is depicted by dimension 310 of FIG. 3C. In this example, linear dimension 310 comprises a plurality of graphical elements including, for example and without limitation, three lines 311, 312, and 313 and a text string 314. Line 311 may be referred to as the starting extension line and extends away from the start point of the dimension (e.g., point 302a of FIG. 2A). Line 312, which may be referred to as an extension line, extends away from the end point of the dimension (e.g., point 302b of FIG. 2B). Line 313 is perpendicular to the lines 311 and 312 and represents the length of the dimension. The dimension text 314 is tied to the dimension line and displays the dimensional value, e.g., length of the dimension, in some unit of measurement. Further, the distance 315 represents a distance between the dimension line 313 and the embedded model 300 being measured. Distance 315 may be adjusted as necessary by the user when adding the dimension object.

In another example, an angular dimension may be provided as a group including three lines and text string, similar to the linear dimension. Similarly, the first line may extend away from the start point of the dimension, and the second line may extend away from the end point of the dimension. The third angular dimension line, however, may be an arc perpendicular to the first and second lines and represents the angle. The dimension text may be, for example, tied to the dimension line and displays the angle in degrees.

Figure 5:
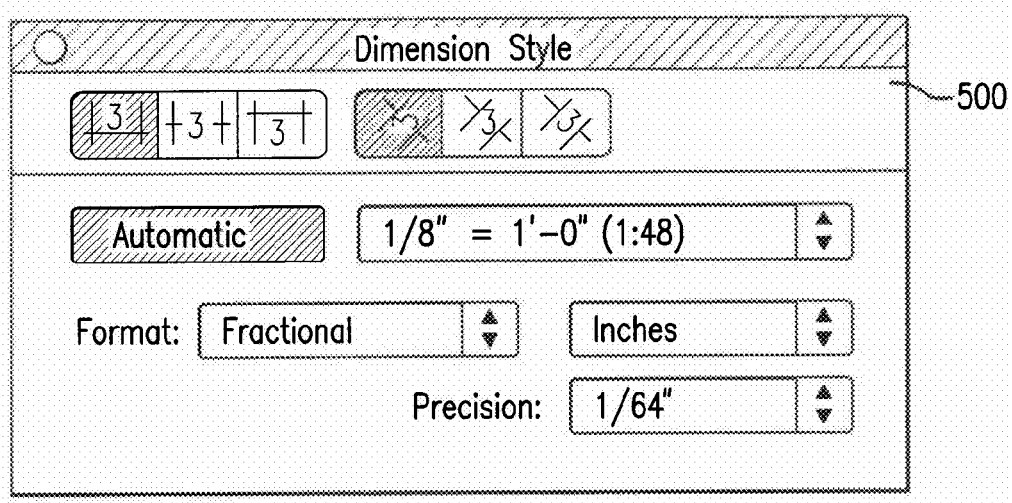
FIG. 5 shows an exemplary dimension properties control box for editing properties of a dimension object by a user, according to an embodiment.

In an embodiment, GUI manager 116 can enable the user to edit the graphical elements (e.g., lines and text strings) of any annotation object, including dimension objects. Further, one or more style properties of the dimension object may also be editable by the user. For example, GUI manager 116 may display a control box (e.g., dimension properties box 500 shown in FIG. 5) that allows the user to change various properties including, but not limited to, a format, orientation, and precision of the text string used to show the dimension value, described above.

It is noted that such dimensions as described herein can measure distances between any points in the document area, such as the distance between two entities, the length of a single line in an entity, or the length of a line in an embedded model. Further, the start and end points of a linear dimension affix the dimension to the embedded models. Thus, when a user moves or resizes embedded models that have an associated dimension, the dimension automatically adjusts accordingly.

Figure 6:
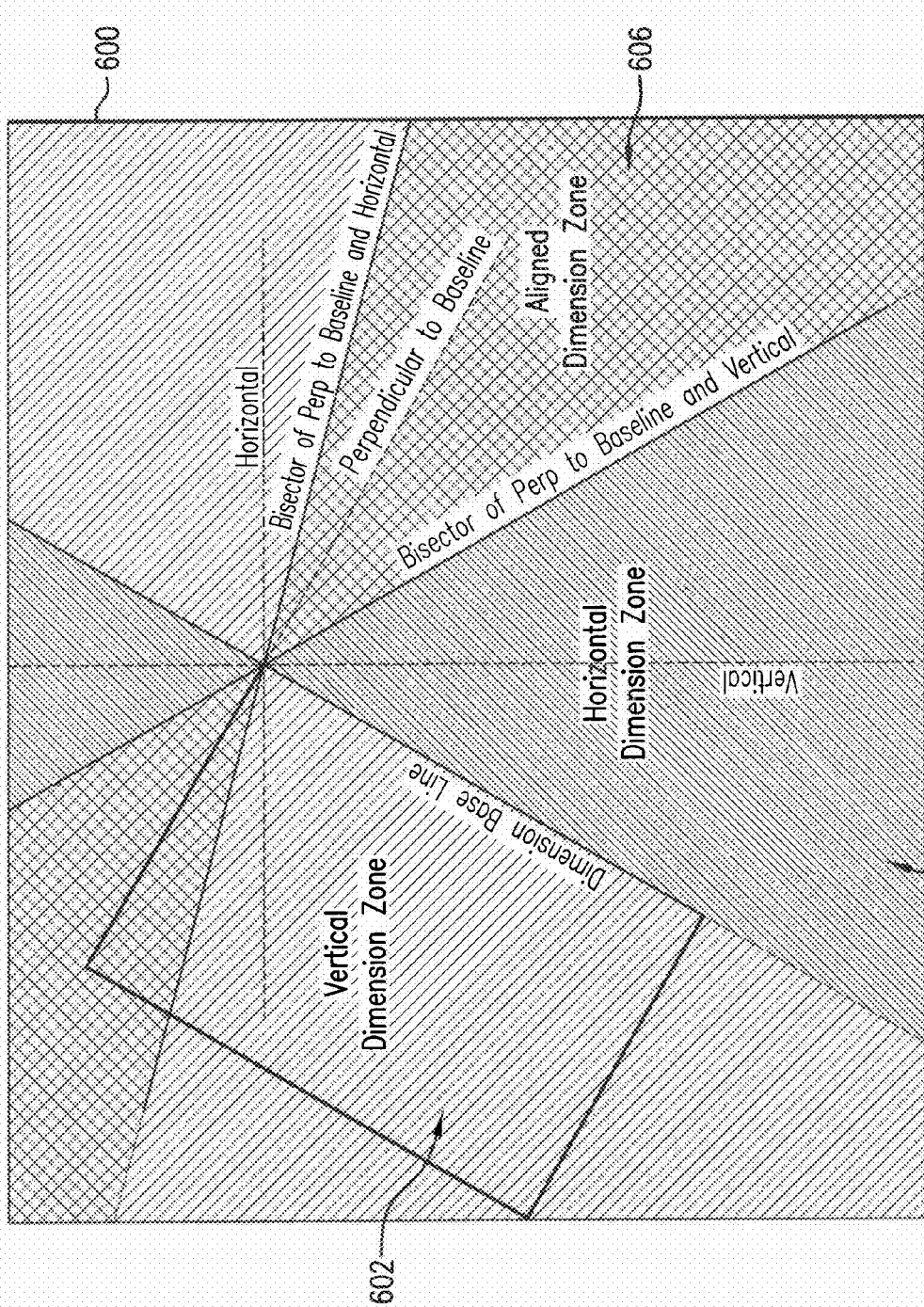
FIG. 6 shows an exemplary 2D viewport space separated into various zones based on a dimension baseline, according to an embodiment.
Figure 7A:
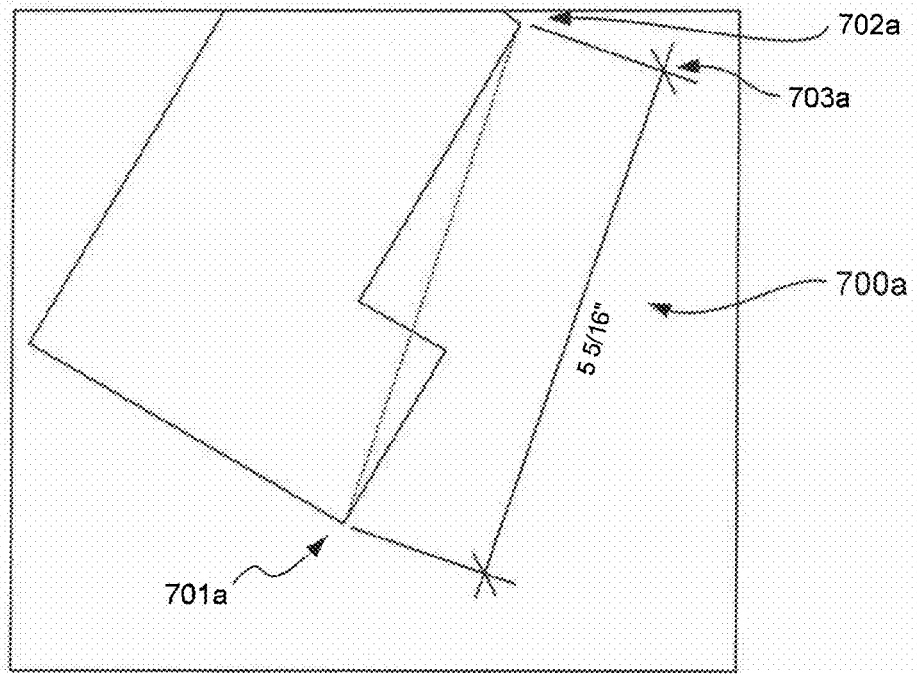
FIG. 7A shows a dimension object aligned to the baseline of an embedded model, according to an embodiment.

Further, as shown in FIG. 6, the 2D viewport space 600 may be separated into various zones based on the dimension baseline. In an embodiment, these zones are used to determine the type of dimension to draw or render within the 2D viewport space. It is noted that the zones illustrated in FIG. 6 are for illustrative purposes only and embodiments are not intended to be limited thereto. For example, some dimensions may not work with the simple zone based choosing of the dimension type. At times, the user may want to align the dimension perpendicular to something other than the dimension baseline. FIG. 7A shows a dimension object 700a that is aligned to the baseline of the embedded model, according to an embodiment. However, such an alignment may not be desired by the user.

Figure 7B:
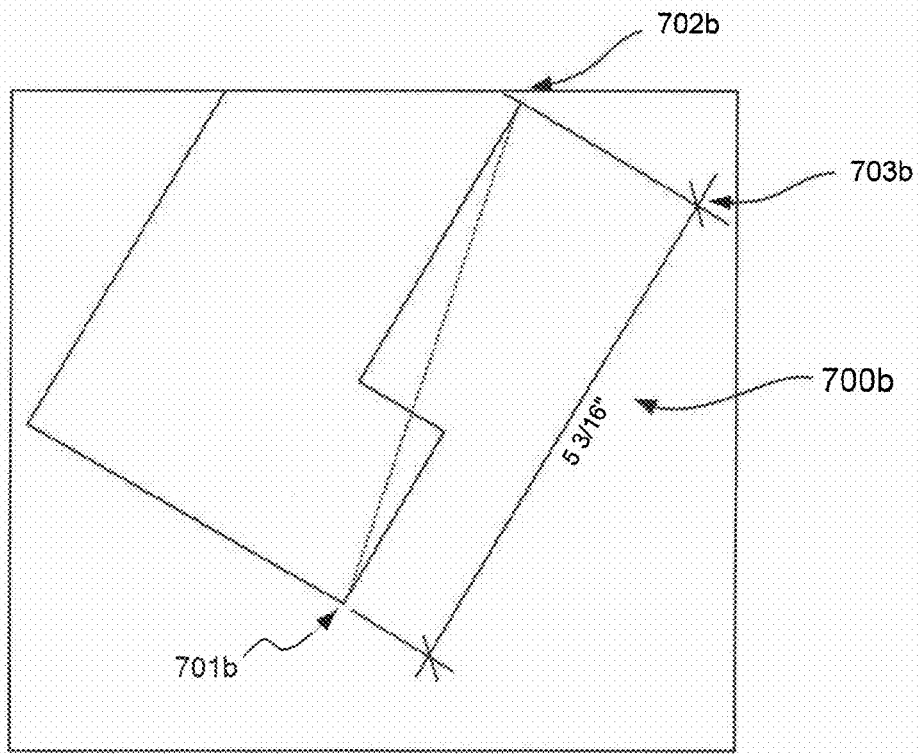
FIG. 7B shows the dimension object aligned perpendicularly and parallel to various control points on an embedded model, according to an embodiment.
Figure 7C:
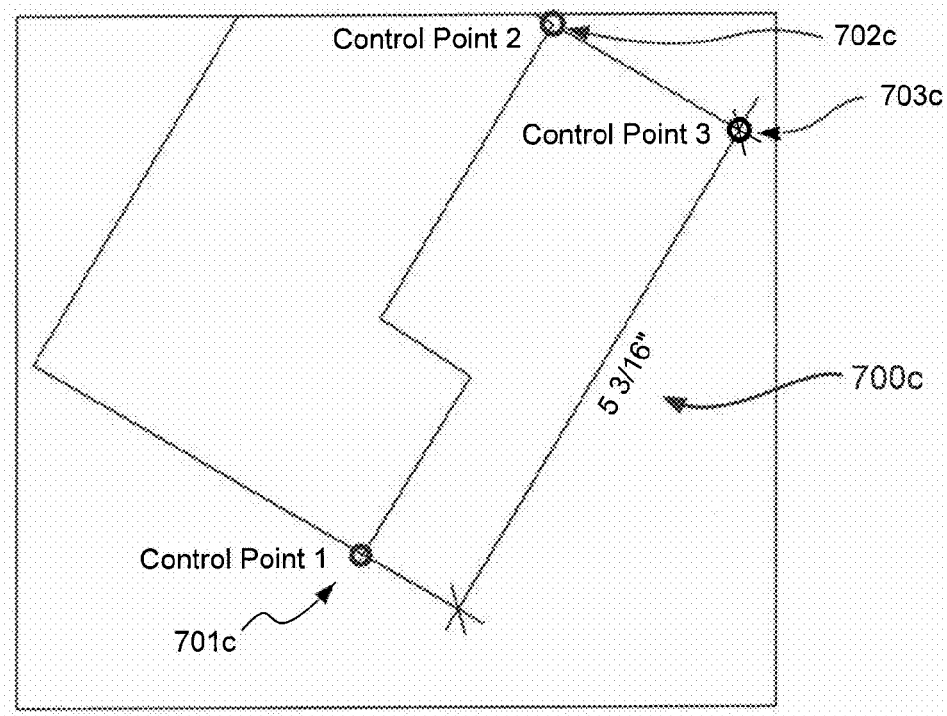
FIG. 7C shows an exemplary set of control points of an embedded model for a dimension object, according to an embodiment.
Figure 7D:
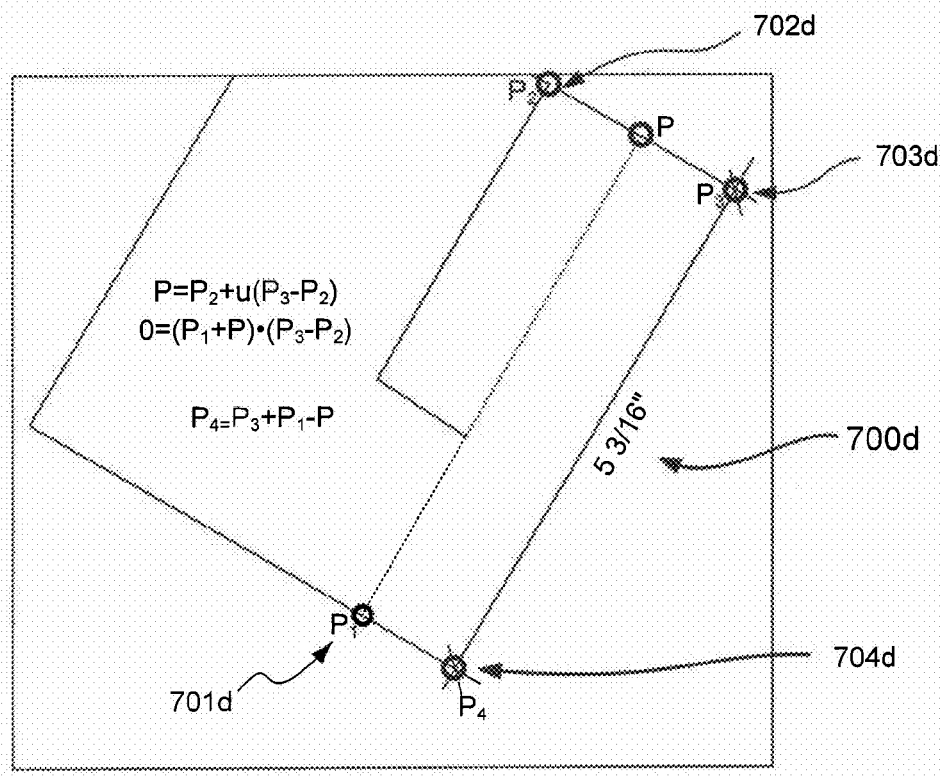
FIG. 7D shows an exemplary method of calculating direction and offsets using various control points for a dimension object, according to an embodiment.

Thus, the user may, at point 703a, select a "Free" mode using an input device (e.g., by pressing an "Option" key in combination with clicking and dragging with a mouse), which can draw a line between the second click point 702a and the mouse position 703a with no zone snapping. In an embodiment, an inference engine may be used to get perpendicular and parallel inferences corresponding to the points in order to obtain an alignment desired by the user, as shown in the example illustrated in FIG. 7B. FIG. 7C shows an exemplary set of control points 701c-703c corresponding to the embedded model for a dimension object 700c, according to an embodiment. FIG. 7D shows an exemplary method of calculating direction and offsets for a dimension object 700d using various control points, according to an embodiment.

It would be apparent to a person skilled in the art that embodiments are not limited to the types of dimension objects described above. Other types of dimension objects may be used as necessary. Further description of dimension objects, including user interface and user interaction examples, can be found, for example, in the user guide and reference guide documentation for the dimension tool of Lay-Out from Google Inc. of Mountain view, CA.

B. Maintaining Connection to Embedded Content

Referring back to FIG. 1, annotation manager 114 creates a dynamic link or connection between the added annotation object and the portion (e.g., one or more points) of the embedded 3D model based on the detected user input. For example, annotation manager 114 may create a dynamic link between the newly added annotation object and one or more control points (based on the user input) with respect to the embedded 3D model (e.g., control points 302a, 302b, and 302c of FIGS. 3A-3C, respectively, described above). In an embodiment, annotation manager 114 calculates the 2D points within the 2D viewport space based on user input (e.g., a mouse position). It would be apparent to a person skilled in the relevant art given this description that any one of various well-known methods may be used by annotation manager 114 to calculate such 2D points.

In an embodiment, annotation manager 114 determines the appropriate control point in the 3D world space of the embedded 3D model corresponding to the 2D point in the 2D viewport space. In an embodiment, annotation manager 114 determines such 3D control points by communicating with or extracting the information from the embedded 3D model itself. For example, the embedded model may provide an application programming interface (API) with which annotation manager 114 can communicate. Such an API may, for example, take input from annotation manager 114 (e.g., a 2D point in the 2D viewport space corresponding to a mouse position) and return the corresponding 3D point in the world space of the embedded 3D model. Accordingly, annotation manager 114 can use the information from the embedded 3D model to attach the 2D point(s) of the annotation object to the 3D point(s) of the embedded 3D model. In this regard, graphical elements of the annotation object within 2D viewport space are connected to the graphical elements of the embedded 3D model within its 3D space.

In an embodiment, annotation manager 114 stores the connection or dynamic link between the annotation object and the 3D model in association with the annotation object. For example, such connection information in addition to any other data specific to the annotation object (e.g., data describing the annotation object's attributes) may be stored as annotation object data 124 in memory 120. In an embodiment, annotation manager 114 uses the connection information associated with the annotation object to render the annotation object with the embedded 3D model within the 2D viewport space. It would be apparent to a person skilled in the relevant art given this description that the 3D connection information does not necessarily have to be stored with the annotation object. For example, connection information may be pulled dynamically from the embedded 3D model as they are both rendered within the 2D viewport space.

As described above, the user may interact with the embedded 3D model to change its orientation, position, and/or scale within the 2D viewport space from the user's perspective. In an embodiment, in response to user input, GUI manager 116 accordingly updates the position of the virtual camera in the 3D world space of the embedded 3D model, as described above. After changes to the embedded 3D model are made by the user, annotation manager 114 uses the connection information stored with the annotation object to determine all of the connections between the annotation object and the embedded 3D model.

In an embodiment, annotation manager 114 determines the appropriate 2D point in the 2D viewport space corresponding to each 3D point of the embedded 3D model based on the connection information. In this regard, the dynamic link or connection enables annotation manager 114 to determine the correct location in the 2D viewport space in which to render the annotation object with the embedded 3D model so as to reflect on any changes made to the 3D model in its 3D world space (e.g., changes made by the user to the position of the virtual camera, as described above). Thus, as the virtual camera's position is changed by the user once the annotation object is added, the annotation object stays connected to the 3D points of the model.

Thus, annotation manager 114 updates the graphical elements of the annotation object within the 2D viewport space based on the changes made to the embedded 3D model. For example, if the annotation object is a dimension object, as described above, annotation manager 114 updates the dimension value of the dimension object to reflect any changes in length (e.g., if the user changes the scale of the 3D model) corresponding to the portion of the embedded 3D model to which the dimension object is attached.

It is noted that annotation manager 114 may derive the correct length for the dimension value as the object is rendered with the 3D model in a number of ways. In an embodiment, an orthographic view of the embedded 3D model may be rendered in the 2D viewport space. As lengths are measureable within orthographic views, an associated scale of the embedded 3D model may be used to determine the length of the relevant portion of the embedded 3D model (e.g., a length of a side of the 3D model 210 of a house, as illustrated in FIGS. 2B and 2C).

In another embodiment, the length can be calculated by snapping or attaching the dimension object to two points within the 3D space of the embedded 3D model, as described above, and thereafter calculating a displacement value between the two points in the 3D space. The 3D model can be orbited to any position and the dimension object will remain connected and display the correct length value. Further, in a perspective view (in contrast to an orthographic view) of an embedded 3D model (see, e.g., example house 3D model 200 shown in of FIGS. 2B-2C), a first dimensioned portion of the 3D model may appear to be a different length from a second dimensioned portion of the model (e.g., front corner of the example house 3D model 200 may appear longer than the back corner) even though the two portions may be of equal length. However, since the dimension object can pull 3D information from the 3D model, the second dimensioned portion can be accurately dimensioned to display the correct value.

Figure 2A:
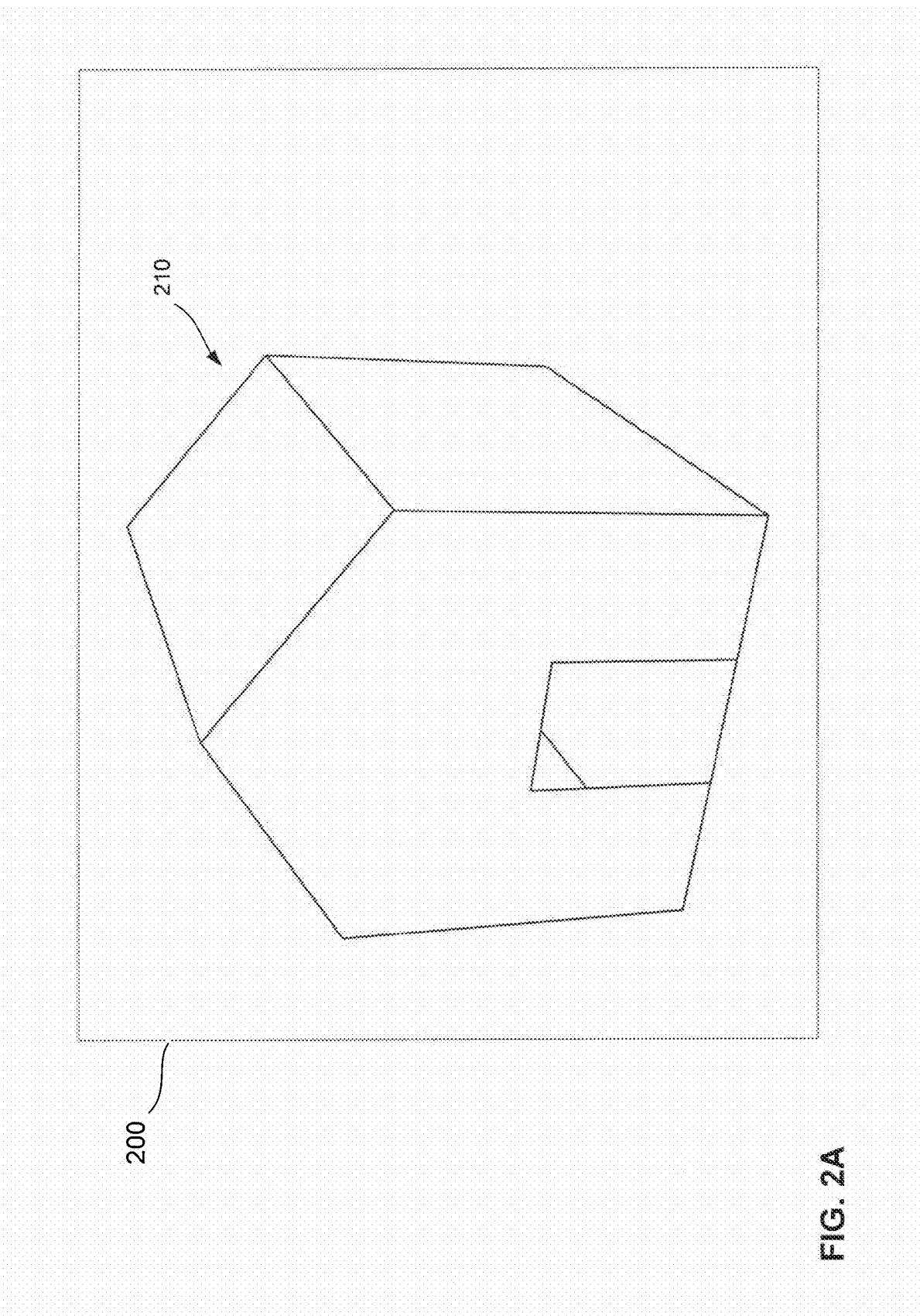
FIG. 2A shows an exemplary embedded three-dimensional model within a two-dimensional viewport space, according to an embodiment.
Figure 2B:
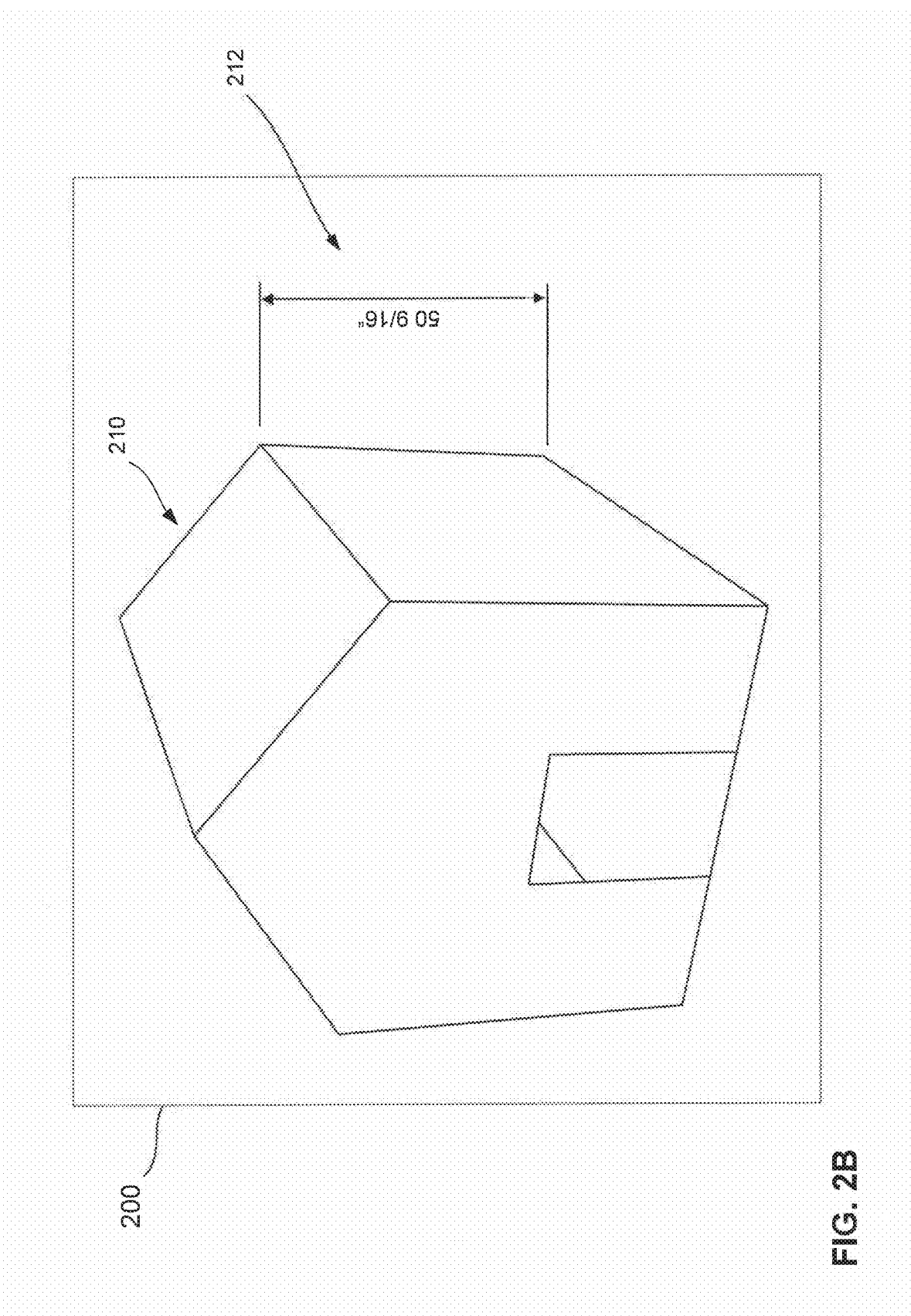
FIG. 2B shows the exemplary three-dimensional model with a type of annotation object within the two-dimensional viewport space, according to an embodiment.
Figure 2C:
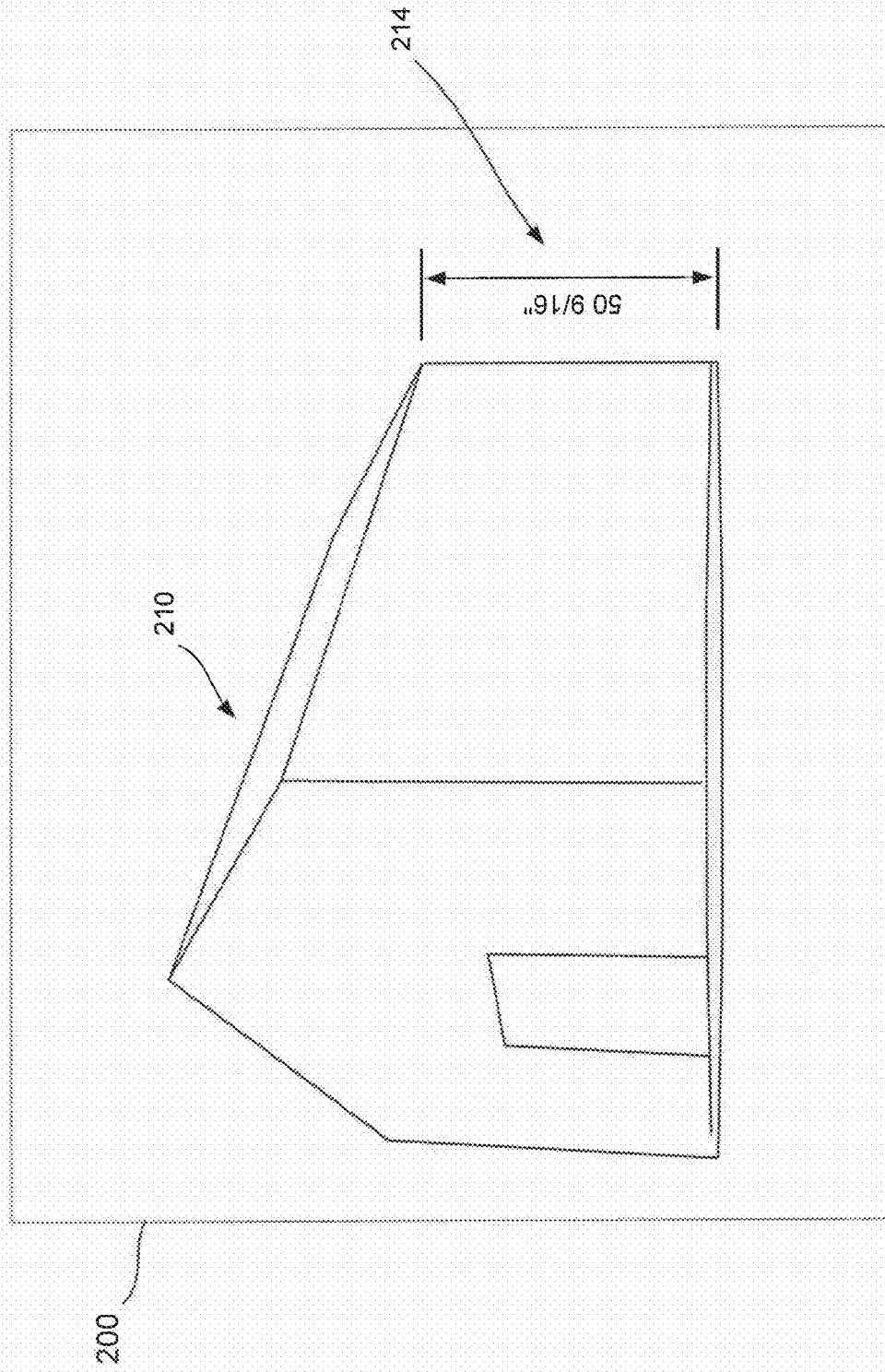
FIG. 2C shows the exemplary three-dimensional model with an updated annotation object within the two-dimensional viewport space based on changes made to the embedded three-dimensional model within three-dimensional space, according to an embodiment.

FIGS. 2A-2C illustrate an example of maintaining connection to an embedded 3D model 210 within a 2D viewport space 200, in accordance with an embodiment. As noted above, the example 3D model 210 of the house shown in FIGS. 2A-2C may have been created in a computer modeling application and later inserted into 2D viewport space 200. FIG. 2A shows embedded 3D model 210 initially inserted into 2D viewport space 200. As described above, 3D model 210 is displayed from the perspective of a virtual camera, which may be adjusted by user interaction with 3D model 210 via a user input device.

FIG. 2B shows 3D model 210 after an annotation object 212, specifically a dimension object, has been added by a user, as described above. In an embodiment, annotation manager 114 calculates 2D points within 2D viewport space 200 based on the user input (e.g., a mouse position) corresponding to 3D model 210. Further, as described above, annotation manager 114 determines 3D points within the 3D world space of 3D model 210 that correspond to the calculated 2D points. Also as described above, annotation manager 114 establishes a connection between the points in 2D viewport space 200 and the 3D points and stores the connection information, including the determined 3D points, in association with annotation object 212 (e.g., as annotation object data 124 in memory 120).

FIG. 2C shows 3D model 210 with an annotation object 214 within 2D viewport space 200 based on changes made to 3D model 210 within its 3D world space, according to an embodiment. In the example shown in FIG. 2C, the user has changed the position of the virtual camera in the 3D world space of 3D model 210. In the example shown in FIG. 2C, annotation manager 114 uses GUI manager 116 to dynamically update annotation object 212 as it is rendered with embedded 3D model 210 within 2D viewport space 200 so as to reflect the changes made to 3D model 210 within its 3D world space, according to an embodiment. Accordingly, annotation object 214 represents an updated version of annotation object 212 based on the changes to 3D model 210, as described above. In an embodiment, the graphical elements of the annotation object have been adjusted to point to the correct locations within 2D viewport space 200.

It is noted that embodiments are not limited to the example illustrated in FIG. 2C. The user may also make other types of changes to 3D model 210. For example, the user may change the scale of 3D model 210 within its 3D world space. Accordingly, annotation manager 114 may use GUI manager 116 to dynamically update the text string of annotation object 214 to match any change in scale of 3D model 210 within its 3D world space.

III. Method

Figure 8:
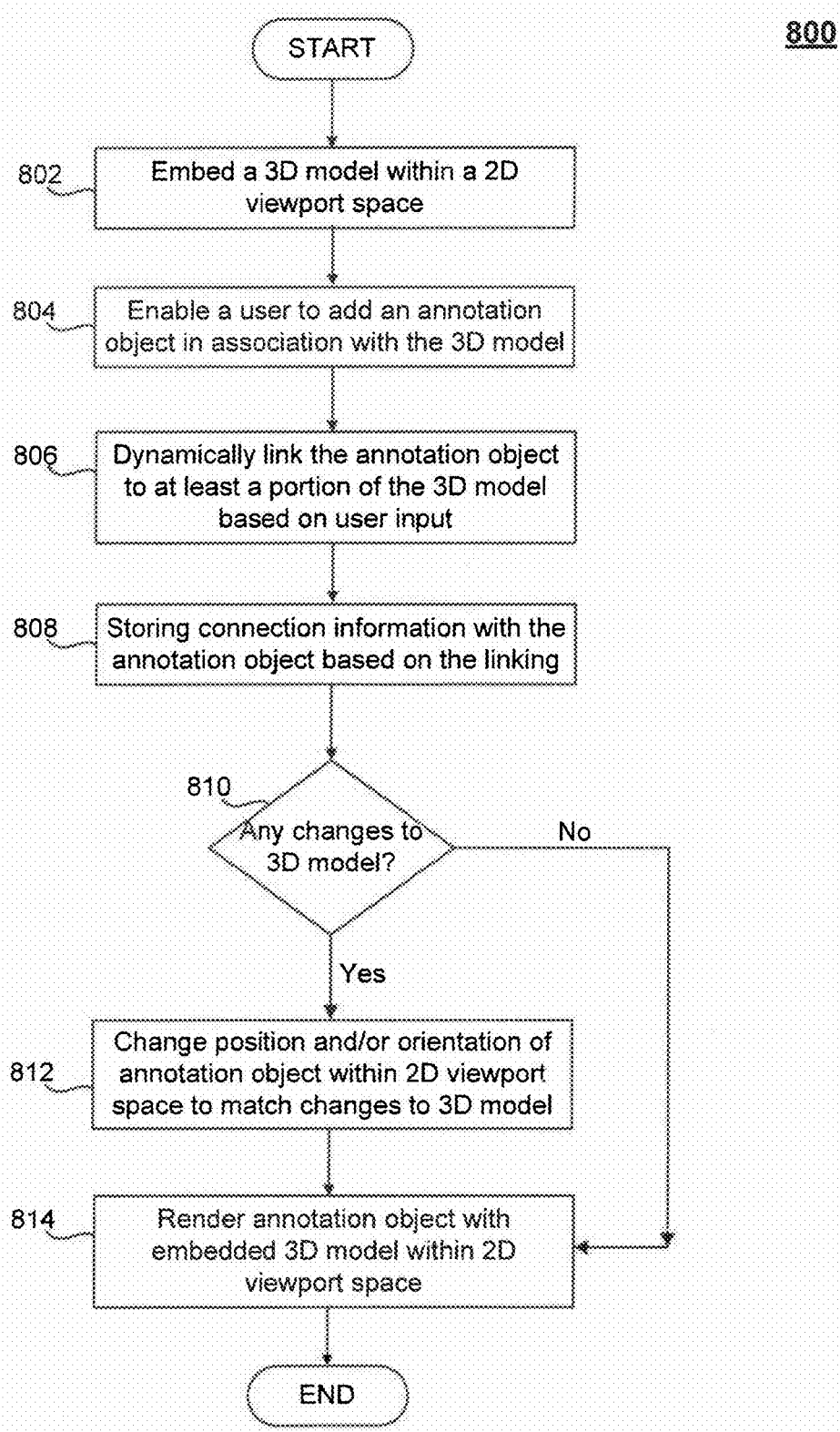
FIG. 8 is a flowchart of an exemplary method for maintaining connection to embedded content using graphical elements, according to an embodiment.

FIG. 8 is a flowchart of an exemplary method 800 for maintaining connection to embedded content using graphical elements, according to an embodiment. Method 800 includes steps 802, 804, 806, 808, 810, 812, and 814. For ease of explanation, method 800 will be described using computing device 100 of FIG. 1, but is not intended to be limited thereto.

Method 800 begins in step 802, in which a 3D model is embedded within a 2D viewport space. As described above, the 3D model may be have been created using a 3D modeling computer program such as, for example, SketchUp from Google Inc. of Mountain View, Calif. The 3D model may be imported directly from such computer program or stored in memory and later inserted into the 2D viewport space through user interaction. It is noted that although method 800 is described in the context of 3D model, embodiments are not limited thereto. Step 802 may be performed by, for example, 3D model manager 112, described above.

Method 800 proceeds to step 804, which includes enabling a user to add an annotation object in association with the 3D model, as described above. In step 806, the added annotation object is dynamically linked to at least a portion of the 3D model based on the user input. For example, the embedded model may provide an interface enabling it to communicate information regarding its graphical elements and/or points corresponding to its graphical elements within its 3D world space. Accordingly, the information from the embedded 3D model can be used to attach the 2D point(s) of the annotation object to the 3D point(s) of the embedded 3D model. As described above, graphical elements of the annotation object within 2D viewport space are connected to the graphical elements of the embedded 3D model within its 3D space.

Method 800 may then proceed to step 808, in which the connection information derived from the embedded 3D model is stored with the annotation object. This stored connection information may then be used in step 810, which includes determining whether any changes have been made to the embedded 3D model. For example, when the user changes the position of the virtual camera to change the viewing perspective of the embedded 3D model, this change can be detected and both the 3D model and the annotation object may be adjusted according to the stored connection information as it is rendered within the 2D viewport space. Thus, method 800 proceeds to step 812 if any changes are detected or to step 814 if no changes have been detected. However, it is noted that step 808 may be optional as the relevant information may be derived as the annotation is dynamically rendered without having to store the connection information.

Step 812 includes changing the position and/or orientation of the annotation object within 2D viewport space to match changes to 3D model, as described above. Method 800 concludes after step 814, which includes rendering the annotation object with embedded 3D model within 2D viewport space. Steps 804, 806, 808, 810, and 812 may be performed by, for example, annotation manager 114, described above. Step 814 may be performed by, for example, GUI manager 116, described above.

One advantage of method 800 is that enables users to add annotations to embedded 3D models within a 2D space without having to manually update the annotation to reflect any changes that may be made to the 3D model within 3D space. Moreover, the ability to manipulate the camera position and perspective effects of the embedded 3D model without disrupting the annotations in the 2D page layout makes method 800 much more flexible and forgiving than conventional methods.

IV. Example Computer System Implementation

Embodiments shown in FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
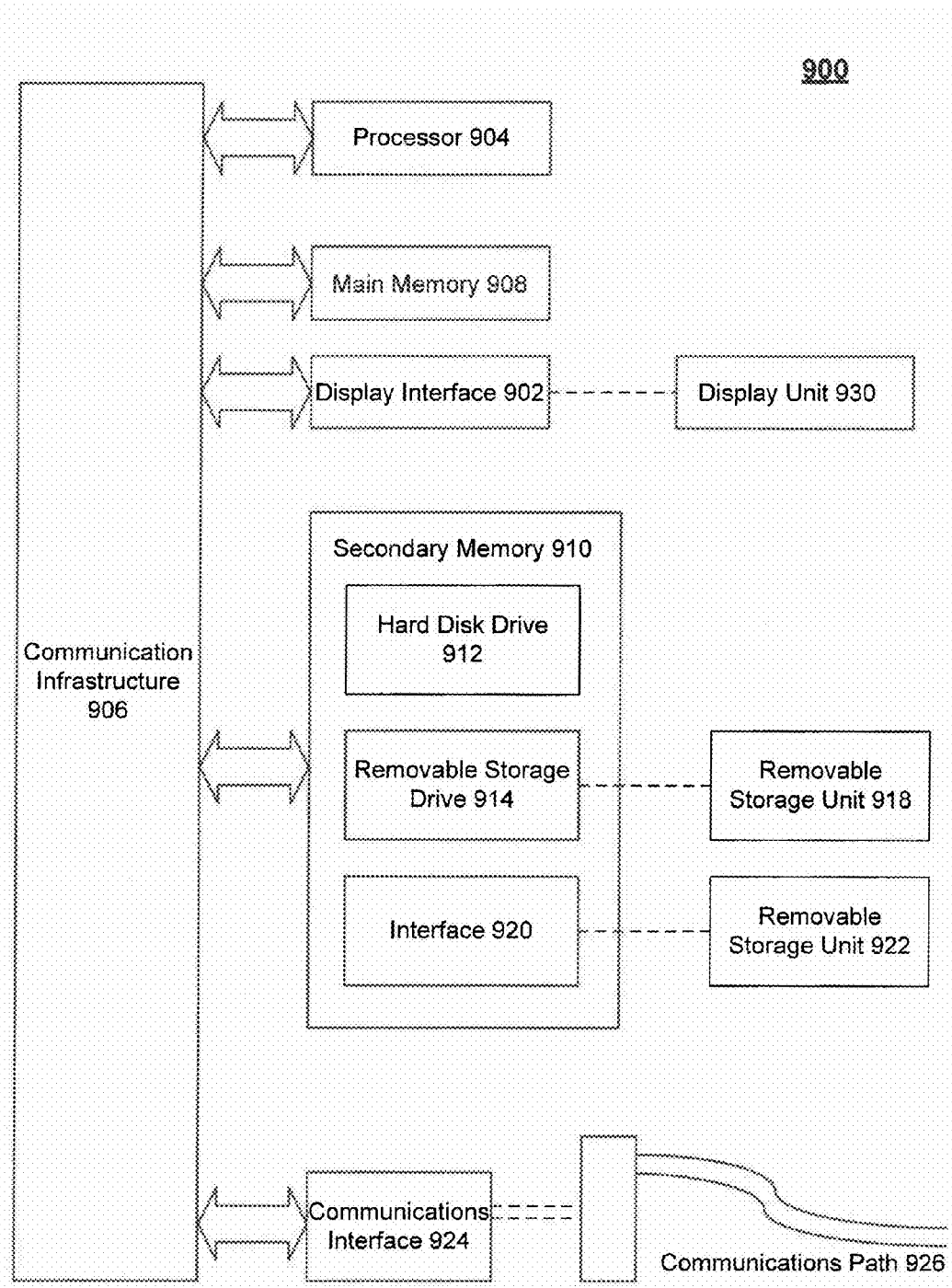
FIG. 9 is a diagram of an example computer system in which embodiments can be implemented.

FIG. 9 illustrates an example computer system 900 in which embodiments, or portions thereof, may be implemented as computer-readable code. For example, computing device 100 in FIG. 1 can be implemented in computer system 900 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the stages in the method illustrated by flowchart 800 of FIG. 8, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

V. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for maintaining a connection to embedded content using a graphical element comprising:

enabling a user to add via user input an annotation object to an embedded three-dimensional graphical model within a two-dimensional viewport space, wherein the embedded three-dimensional model includes a first plurality of graphical elements including a first graphical element and the annotation object includes a second plurality of graphical elements including a second graphical element;

detecting the user input corresponding to the embedded three-dimensional graphical model within the two-dimensional viewport space based on the enabling;

determining a first position of the second graphical element of the annotation object in the two-dimensional viewport space based on the detected user input;

determining a second position of the first graphical element of the embedded three-dimensional graphical model in the three-dimensional space based on the determined first position;

dynamically linking the first position of the second graphical element of the annotation object in the two-dimensional viewport space to the second position of the first graphical element of the embedded three-dimensional graphical model in the three-dimensional space based on the detected user input;

storing connection information in association with the annotation object in memory based on the linking, the connection information corresponding to the linked first position of the second graphical element of the embedded three-dimensional graphical model within the two-dimensional viewport space; and rendering the annotation object with the embedded three-dimensional graphical model within the two-dimensional viewport space based on the stored connection information, wherein positions of the second plurality of graphical elements of the annotation object are dynamically changed within the two-dimensional viewport space as the annotation object is rendered with the embedded three-dimensional graphical model so as to reflect any changes that are made by the user to positions of the first plurality of graphical elements of the embedded three-dimensional graphical model within three-dimensional space, wherein the enabling, the dynamically linking, the storing, and the rendering are performed by one or more computing devices.

2. The method of claim 1, wherein the annotation object is a dimension object having a dimension value corresponding to a length of a portion of the embedded three-dimensional graphical model.

3. The method of claim 2, wherein the rendering further comprises:
rendering an orthographic view of the embedded three-dimensional graphical model within the two-dimensional viewport space; and
determining the dimension value for the dimension object based on a scale associated with the embedded three-dimensional graphical model in the rendered orthographic view.

4. The method of claim 2, further comprising:
dynamically linking the dimension object to a first point and a second point corresponding to the portion of the embedded three-dimensional graphical model;
calculating a displacement value between the first and second points in the three-dimensional space; and
updating the dimension value for the dimension object based on the calculated displacement value.

5. The method of claim 4, wherein the dimension value of the dimension object is dynamically updated as it is rendered with the embedded three-dimensional graphical model within the two-dimensional viewport space so as to match any changes that are made by the user to the embedded three-dimensional graphical model within the three-dimensional space.

6. The method of claim 1, further comprising:
enabling the user to modify attributes of the second plurality of graphical elements of the annotation object within the two-dimensional viewport space.

7. The method of claim 1, wherein the changes that are made to the embedded three-dimensional graphical model include changes in scale of graphical model within the two-dimensional viewport space.

8. The method of claim 1, wherein the changes that are made to the embedded three-dimensional graphical model include changes to a position and an orientation of the embedded three-dimensional graphical model within the three-dimensional space.

9. The method of claim 8, further comprising:
enabling the user to change the position and the orientation of the embedded three-dimensional graphical model within the three-dimensional space; and
rendering the changed embedded three-dimensional graphical model within the two-dimensional viewport space based on the enabling.

10. The method of claim 9, wherein the enabling the user to change the position and the orientation comprises:
enabling the user to change a perspective of a virtual camera corresponding to the embedded three-dimensional graphical model within the two-dimensional viewport space, and
wherein the rendering the changed embedded three-dimensional graphical model comprises:
rendering the embedded three-dimensional graphical model within the two-dimensional viewport space according to the changed perspective of the virtual camera based on the enabling.

11. The method of claim 1, further comprising:
detecting the changes made by the user to the positions of the first plurality of graphical elements of the embedded three-dimensional graphical model within the three-dimensional space; and
updating the positions of the second plurality of graphical elements of the annotated object within the two-dimensional viewport space based on the detected changes made to the positions of the first plurality of graphical elements.

12. The method of claim 1, wherein the three-dimensional graphic model is provided from a three-dimensional modeling application separate from the two-dimensional page layout application.

13. The method of claim 1, wherein the dynamically linking further comprises determining a location in the three-dimensional world space of the embedded three-dimensional model corresponding to a two-dimensional location of the annotation object in the two-dimensional viewport space; and
wherein the rendering the annotation object with the embedded three-dimensional graphical model within the two-dimensional viewport space based on the stored connection information further comprises determining a location in the two-dimensional viewport space in which to render the annotation object based on the connection information.

14. The method of claim 1, further comprising:
receiving the three-dimensional graphic model having the three-dimensional world space;
embedding the three-dimensional graphic model within the two-dimensional viewport space of a two-dimensional page layout application; and
displaying a two-dimensional representation of the three-dimensional graphical model in the two-dimensional viewport space of the two-dimensional page layout application.

15. A computer-implemented method for maintaining a connection to embedded content using a graphical element comprising:
receiving a three-dimensional graphic model having a three-dimensional world space;
embedding the three-dimensional graphic model within a two-dimensional viewport space of a two-dimensional page layout application;
displaying a two-dimensional representation of the three-dimensional graphical model in the two-dimensional viewport space of the two-dimensional page layout application;
enabling a user to add via user input an annotation object in association with the embedded three-dimensional graphical model within the two-dimensional viewport space, wherein the embedded three-dimensional model includes a first plurality of graphical elements including a first graphical element and the annotation object includes a second plurality of graphical elements including a second graphical element;
determining a first position of the second graphical element of the annotation object in the two-dimensional viewport space based on a detected user input;
determining a second position of the first graphical element of the embedded three-dimensional graphical model in the three-dimensional world space based on the determined first position;
dynamically linking the first position of the second graphical element of the annotation object in the two-dimensional viewport space to the second position of the first graphical element of the embedded three-dimensional graphical model in the three-dimensional world space;

storing connection information in association with the annotation object in memory based on the linking, wherein positions of the second plurality of graphical elements of the annotation object are automatically changed within the two-dimensional viewport space as the annotation object is rendered with the embedded three-dimensional graphical model within the two-dimensional viewport space so as to match any changes that are made by the user to positions of the first plurality of graphical elements of the embedded three-dimensional graphical model within three-dimensional world space; and rendering the annotation object with the embedded three-dimensional graphical model within the two-dimensional viewport space, wherein the enabling, the dynamically linking, the storing, and the rendering are performed by one or more computing devices.

16. A system for maintaining a connection to embedded content using a graphical element comprising:

a processing device, including:

a processor; and memory, wherein one or more managers are stored in the memory and executed by the processor, the managers including:

a three-dimensional model manager to embed a three-dimensional graphical model within a two-dimensional viewport space;

a graphical user interface (GUI) manager to enable a user to add via user input an annotation object to the embedded three-dimensional graphical model within the two-dimensional viewport space, and to detect the user input corresponding to the embedded three-dimensional graphical model within the two-dimensional viewport space, wherein the embedded three-dimensional model includes a first plurality of graphical elements including a first graphical element and the annotation object includes a second plurality of graphical elements including a second graphical element; and an annotation manager to determine a first position of the second graphical element of the annotation object in the two-dimensional viewport space based on the detected user input, to determine a second position of the first graphical element of the embedded three-dimensional graphical model in the three-dimensional space based on the determined first position, to dynamically link the first position of the second graphical element of the annotation object in the two-dimensional viewport space to the second position of the first graphical element of the embedded three-dimensional graphical model in the three-dimensional space, to store connection information in association with the annotation object in memory based on the link, the connection information corresponding to one or more points associated with the second position of the first graphical element of the embedded three-dimensional model within the two-dimensional viewport space, and to render the annotation object with the embedded three-dimensional graphical model within the two-dimensional viewport space based on the stored connection information, wherein positions of the second plurality of graphical elements of the annotation object are dynamically changed within the two-dimensional viewport space as the annotation object is rendered with the embedded three-dimensional graphical model so as to reflect any changes that are made by the user to positions of the first plurality of graphical elements of the embedded three-dimensional graphical model within three-dimensional space.

17. The system of claim 16, wherein the annotation object is a dimension object having a dimension value corresponding to a length of a portion of the embedded three-dimensional graphical model.

18. The system of claim 17, wherein the annotation manager is further configured to render an orthographic view of the embedded three-dimensional graphical model within the two-dimensional viewport space, and to determine the dimension value for the dimension object based on a scale associated with the embedded three-dimensional graphical model in the rendered orthographic view.

19. The system of claim 17, wherein the annotation manager is configured to dynamically link the dimension object to a first point and a second point corresponding to the portion of the embedded three-dimensional graphical model, and to render the annotation object with the embedded three-dimensional graphical model within the two-dimensional viewport space based on the stored connection information by calculating a displacement value between the first and second points in the three-dimensional space and updating the dimension value for the dimension object based on the calculated displacement value.

20. The system of claim 19, wherein the annotation manager is further configured to dynamically update the dimension value of the dimension object as it is rendered with the embedded three-dimensional graphical model within the two-dimensional viewport space so as to match any changes that are made by the user to the position or the orientation of the embedded three-dimensional graphical model within the three-dimensional space.

21. The system of claim 16, wherein the three-dimensional model manager receives the three-dimensional graphic model having the three-dimensional space and embeds the three-dimensional graphical model within a two-dimensional viewport space of a two-dimensional page layout application; and wherein the GUI manager displays the two-dimensional representation of the three-dimensional graphical model in the two-dimensional viewport space of the two-dimensional page layout application.

22. A computer readable storage device having control logic recorded thereon that if executed by a processor, causes the processor to perform operations to maintain a connection to embedded content using a graphical element, the operations comprising:

enabling a user to add via user input an annotation object to an embedded three-dimensional graphical model within a two-dimensional viewport space, wherein the embedded three-dimensional model includes a first plurality of graphical elements including a first graphical element and the annotation object includes a second plurality of graphical elements including a second graphical element;

detecting the user input corresponding to the embedded three-dimensional graphical model within the two-dimensional viewport space based on the enabling;

determining a first position of the second graphical element of the annotation object in the two-dimensional viewport space based on the detected user input;

determining a second position of the first graphical element of the embedded three-dimensional graphical model in the three-dimensional space based on the determined first position;

dynamically linking the first position of the second graphical element of the annotation object in the two-dimensional viewport space to the second position of the first graphical element of the embedded three-dimensional graphical model in the three-dimensional space based on the detected user input;

storing connection information in association with the annotation object in memory based on the linking, the connection information corresponding to the linked second position of the first graphical element of the embedded three-dimensional graphical model within the two-dimensional viewport space; and rendering the annotation object with the embedded three-dimensional graphical model within the two-dimensional viewport space based on the stored connection information, wherein positions of the second plurality of graphical elements of the annotation object are dynamically changed within the two-dimensional viewport space as the annotation object is rendered with the embedded three-dimensional graphical model so as to reflect any changes that are made by the user to positions of the first plurality of graphical elements of the embedded three-dimensional graphical model within three-dimensional space, and the enabling, the dynamically linking, the storing, and the rendering are performed by one or more computing devices.

23. The computer readable storage device of claim 22, further comprising:

receiving the three-dimensional graphic model having the three-dimensional world space;

embedding the three-dimensional graphic model within the two-dimensional viewport space of a two-dimensional page layout application; and displaying the two-dimensional representation of the three-dimensional graphical model in the two-dimensional viewport space of the two-dimensional page layout application.

* * * * *